(12) United States Patent
German-Sobek et al.

(10) Patent No.: US 12,249,769 B2
(45) Date of Patent: Mar. 11, 2025

(54) MIMO ANTENNA SYSTEM (71) Applicants: 2J ANTENNAS USA, CORPORATION, Gilbert, AZ (US); 2J ANTENNAS S.R.O., Bardejov (SK)

(72) Inventors: Martin German-Sobek, Lukavica (SK); Michal Kosterec, Ladomirova (SK)

(73) Assignee: 2J ANTENNAS USA, CORPORATION, Gilbert, AZ (US)

( * ) Notice: Subject to any disclaimer, the term of this patent is extended or adjusted under 35 U.S.C. 154(b) by 0 days.

(21) Appl. No.: 17/789,967

(22) PCT Filed: Mar. 3, 2022

(86) PCT No.: PCT/US2022/018695
§ 371 (c)(1),
(2) Date: Jun. 29, 2022

(87) PCT Pub. No.: WO2023/167673
PCT Pub. Date: Sep. 7, 2023

(65) Prior Publication Data
US 2024/0356241 A1 Oct. 24, 2024

(51) Int. Cl.
*H01Q 21/28* (2006.01)
*H01Q 1/38* (2006.01)
*H01Q 1/48* (2006.01)

(52) U.S. Cl.
CPC ............... *H01Q 21/28* (2013.01); *H01Q 1/38* (2013.01); *H01Q 1/48* (2013.01)

(58) Field of Classification Search
CPC ........ H01Q 1/38; H01Q 1/48–52; H01Q 9/28; H01Q 21/00; H01Q 21/28
See application file for complete search history.

(56) References Cited

U.S. PATENT DOCUMENTS

| | | | |
|---|---|---|---|
| 10,680,339 B2 * | 6/2020 | Ng | H01Q 9/285 |
| 2018/0062731 A1 * | 3/2018 | Ng | H01Q 9/285 |
| 2019/0044232 A1 | 2/2019 | Tseng et al. | |
| 2019/0115664 A1 | 4/2019 | Veihl et al. | |
| 2019/0268045 A1 | 8/2019 | Pollman et al. | |
| 2021/0066795 A1 | 3/2021 | Flores-Cuadras | |
| 2021/0126346 A1 | 4/2021 | Nystrom | |

* cited by examiner

*Primary Examiner* — Hasan Islam
(74) *Attorney, Agent, or Firm* — CP LAW GROUP PC; Cy Bates (57) ABSTRACT A MIMO antenna system is disclosed. The system generally includes a substrate having a first antenna radiator and a second antenna radiator disposed on a first side thereof. The first antenna radiator is disposed on a first longitudinal half of the substrate and the second antenna radiator is disposed on a second longitudinal half of the substrate. The second antenna radiator is a mirror opposite of the first antenna radiator wherein the second antenna radiator comprises a horizontal offset relative to the first antenna radiator. The substrate comprises a middle portion having a plurality of apertures configured to receive a plurality of tabs from a ground plane wherein the ground plane is configured to couple to the substrate at a second side, opposite the first side.

20 Claims, 7 Drawing Sheets

MIMO ANTENNA SYSTEM

TECHNICAL FIELD

This invention relates to antennas; more particularly, multiple input multiple output (MIMO) antenna systems for operation in various wireless technologies.

BACKGROUND ART

MIMO systems are used with cellular applications to enhance data rates and signal quality. As wireless technologies continue to improve, wireless applications in industries such as automotive will require MIMO systems that can support various wireless technologies while simultaneously being compact and rugged.

SUMMARY OF INVENTION

Technical Problem

Antenna systems used in certain applications, such as vehicles, have limited space and are required to have a small form factor. However, keeping antenna systems small in cellular applications is challenging, especially in the 5G NR bands where the lower frequencies require larger antennas. Therefore, minimizing antenna size and efficiently using space are needed for MIMO systems.

Solution to Problem

Disclosed is a MIMO antenna system that comprises a substrate, a first antenna radiator, a second antenna radiator, and a ground plane. The substrate has a first longitudinal half, a second longitudinal half, and a middle portion disposed between the first longitudinal half and the second longitudinal half, the substrate further comprises a first side and a second side opposite the first side, and the middle portion comprises a plurality of apertures. The first antenna radiator is disposed on the first side of the substrate at the first longitudinal half, the first antenna radiator vertically extends from a first proximal end to a first distal end, and the first proximal end comprises a first apex disposed at the middle portion. The second antenna radiator is disposed on the first side of the substrate at the second longitudinal half, the second antenna radiator vertically extends from a second proximal end to a second distal end, and the second proximal end comprises a second apex disposed at the middle portion. The ground plane is configured to couple to the second side of the substrate. The ground plane comprises a plurality of tabs configured to extend through the plurality of apertures, wherein at least one of the plurality of tabs is configured to electrically couple to each of the first and second antenna radiators. The MIMO antenna system is characterized in that the first apex and the second apex are separated by a horizontal offset, and the second antenna radiator is a mirror opposite of the first antenna radiator.

In some embodiments, the ground plane may be aligned perpendicularly with the substrate. In some embodiments, the substrate may further comprise a plurality fixating holes wherein at least one of the plurality of fixating holes is disposed on the first antenna radiator and at least one of the plurality of fixating holes is disposed on the second antenna radiator.

Advantageous Effects of Invention

A MIMO system comprising a first and second antenna radiators having a horizontal offset improves isolation and envelope correlation coefficient (ECC) in comparison to the first and second antenna radiators placed directly opposite to one another.

Having the second antenna radiator being a mirror opposite of the first antenna radiator prevents cancellation. Furthermore, the first and second antenna radiators being on opposite halves of a substrate minimizes footprint compared to when the first and second antenna radiators are side-by-side.

The ground plane being at a perpendicular alignment with the substrate reduces footprint and provides support to the antenna radiators and further allows for soldering cables. The perpendicular alignment also allows for production repeatability. Standard printed circuit boards and standard tooling for creating the plurality of apertures can be used to create the perpendicular alignment.

One or more fixation holes being disposed within the first and second antenna radiators provides stronger stability for high vibration environments while reducing the footprint.

The MIMO antenna system can function with various wireless technologies simultaneously including 5G NR, 4G, Wi-Fi, ISM, and others.

Other features and benefits will be appreciated by one having skill in the art upon a thorough review of the instant disclosure.

BRIEF DESCRIPTION OF THE DRAWINGS

Other features, combinations, and embodiments will be appreciated by one having the ordinary level of skill in the art of antennas and accessories upon a thorough review of the following details and descriptions, particularly when reviewed in conjunction with the drawings, wherein.

DETAILED DESCRIPTION

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "MIMO" means Multiple Input Multiple Output.

The term "substrate" means a flat or nearly flat surface that contains a conducting portion and can be used a holder of surface mount antennas.

The term "radiator" means a conducting element of an antenna that is electrically connected to a radio receiver and/or a radio transmitter and which transmits and/or receives radio waves.

The term "mirror opposite" means an object that is identical in form to another, but with the structure reversed.

The term "longitudinal half" means a significant portion of a substrate that may or may not occupy 50% of the substrate footprint.

Unless explicitly defined herein, terms are to be construed in accordance with the plain and ordinary meaning as would be appreciated by one having skill in the art.

General Description of Embodiments

In one general embodiment, a MIMO antenna system is disclosed. The A MIMO antenna system comprises a substrate having a first longitudinal half, a second longitudinal half, and a middle portion disposed between the first longitudinal half and the second longitudinal half, the substrate further comprising a first side and a second side opposite the first side, the middle portion comprising a plurality of apertures. The MIMO antenna system further comprises a first antenna radiator, a second antenna radiator, a third antenna radiator, and a fourth antenna radiator. The first antenna radiator is disposed on the first side of the substrate at the first longitudinal half, the first antenna radiator vertically extends from a first proximal end to a first distal end, wherein the first proximal end comprises a first apex disposed at the middle portion, the first apex having a first feed pad. The second antenna radiator is disposed on the first side of the substrate at the second longitudinal half, the second antenna radiator vertically extends from a second proximal end to a second distal end, the second proximal end comprising a second apex disposed at the middle portion, the second apex having a second feed pad. The third antenna radiator is disposed on the first side of the substrate at the first longitudinal half, the third antenna radiator has a third feed pad disposed at the middle portion. The fourth antenna radiator is disposed on the first side of the substrate at the second longitudinal half, the fourth antenna radiator has a fourth feed pad disposed at the middle portion. The MIMO antenna system further comprises a ground plane configured to couple to the second side of the substrate, the ground plane comprises a plurality of tabs configured to extend through the plurality of apertures, wherein at least one of the plurality of tabs configured to electrically couple to each of the first through fourth antenna radiators. The MIMO antenna system is characterized in that the first apex and the second apex are separated by a horizontal offset, and the second antenna radiator is a mirror opposite of the first antenna radiator.

In some embodiments, the fourth antenna radiator may comprise a vertical reflection of the third antenna radiator and may further comprise a horizontal reflection of the third antenna radiator.

In some embodiments, the plurality of tabs may further comprise a first feed line tab and a second feed line tab, the first feed line tab configured to electrically couple with the first feed pad and the fourth feed pad, and the second feed line tab configured to electrically couple with the second feed pad and the third feed pad.

In some embodiments, the first feed line tab and the second feed line tab may each be orthogonal to the first through fourth feed pads.

In some embodiments, the plurality of apertures may comprise a collinear alignment.

In some embodiments, the ground plane may further comprise one or more fixating tabs.

In some embodiments, the substrate may further comprise a plurality fixating holes wherein at least one of the plurality of fixating holes is disposed on the first antenna radiator and at least one of the plurality of fixating holes is disposed on the second antenna radiator.

In some embodiments, the ground plane may comprise a perpendicular orientation with the substrate.

In some embodiments, the substrate and the ground plane may form an angle, the angle comprising between and inclusive of seventy and ninety degrees.

In a second general embodiment, a MIMO antenna system is disclosed. The MIMO antenna system comprises a substrate, a first antenna radiator, a second antenna radiator, and a ground plane. The substrate has a first longitudinal half, a second longitudinal half, and a middle portion disposed between the first longitudinal half and the second longitudinal half, the substrate further comprises a first side and a second side opposite the first side, and the middle portion comprises a plurality of apertures. The first antenna radiator is disposed on the first side of the substrate at the first longitudinal half, the first antenna radiator vertically extends from a first proximal end to a first distal end, and the first proximal end comprises a first apex disposed at the middle portion. The second antenna radiator is disposed on the first side of the substrate at the second longitudinal half, the second antenna radiator vertically extends from a second proximal end to a second distal end, and the second proximal end comprises a second apex disposed at the middle portion. The ground plane is configured to couple to the second side of the substrate. The ground plane comprises a plurality of tabs configured to extend through the plurality of apertures, wherein at least one of the plurality of tabs is configured to electrically couple to each of the first and second antenna radiators. The MIMO antenna system is characterized in that the first apex and the second apex are separated by a horizontal offset, and the second antenna radiator is a mirror opposite of the first antenna radiator.

In some embodiments, the plurality of apertures may comprise a collinear alignment.

In some embodiments, the ground plane may further comprise one or more fixating tabs.

In some embodiments, the substrate may further comprise a plurality fixating holes wherein at least one of the plurality of fixating holes is disposed on the first antenna radiator and at least one of the plurality of fixating holes is disposed on the second antenna radiator.

In some embodiments, the ground plane may comprise a perpendicular orientation with the substrate.

In some embodiments, the substrate and the ground plane may form an angle, the angle comprising between and inclusive of seventy and ninety degrees.

In a third general embodiment, a MIMO antenna array is disclosed. The MIMO antenna array comprises a plurality of substrates and a ground plane configured to couple to each of the plurality of substrates. Each of the plurality of substrates comprises a first longitudinal half and a second longitudinal half, a middle portion disposed between the first longitudinal half and the second longitudinal half, the middle portion comprising a plurality of apertures, a first side and a second side opposite the first side, a first antenna radiator disposed on the first side of the substrate at the first longitudinal half, the first antenna radiator vertically extending from a first proximal end to a first distal end, the first proximal end comprising a first apex disposed at the middle portion, a second antenna radiator disposed on the first side of the substrate at the second longitudinal half, the second antenna radiator vertically extending from a second proximal end to a second distal end, the second proximal end comprising a second apex disposed at the middle portion, the second antenna radiator is a mirror opposite of the first antenna radiator, a third antenna radiator disposed on the first side of the substrate at the first longitudinal half, and a fourth antenna radiator disposed on the first side of the substrate at the second longitudinal half. The ground plane is configured to couple to a second side of each of the plurality of substrates. The ground plane comprises a plurality of tabs configured to extend through each of the plurality of apertures. The MIMO antenna array is characterized in that the first apex and the second apex of each of the plurality of substrates are separated by a horizontal offset.

In some embodiments, the fourth antenna radiator may comprise a vertical reflection of the third antenna radiator and may further comprise a horizontal reflection of the third antenna radiator.

In some embodiments, the MIMO antenna array may further comprise a first feed pad disposed on the first apex, a second feed pad disposed on the second apex, a third feed pad disposed on the third antenna radiator at the middle portion, and a fourth feed pad disposed on the fourth antenna radiator at the middle portion, wherein at least one of the plurality of tabs may be configured to electrically couple to each of the first through fourth antenna radiators.

In some embodiments, the plurality of tabs may further comprise a first feed line tab and a second feed line tab, the first feed line tab configured to electrically couple with the first feed pad and the fourth feed pad, and the second feed line tab configured to electrically couple with the second feed pad and the third feed pad.

In some embodiments, the first feed line tab and the second feed line tab may each be orthogonal to the first through fourth feed pads.

In some embodiments, each of the plurality of substrates may further comprise a first via pad disposed on the first antenna radiator and a second via pad disposed on the third antenna radiator.

In some embodiments, each of the plurality of substrates may comprise a plurality of fixating holes, wherein at least one of the plurality of fixating holes is disposed on the first antenna radiator and at least one of the plurality of fixating holes is disposed on the second antenna radiator.

In some embodiments, the plurality of apertures may comprise a collinear alignment.

In some embodiments, the ground plane may further comprise one or more fixating tabs.

In some embodiments, the ground plane may comprise a perpendicular orientation with each of the plurality of substrates.

In some embodiments, the plurality of substrates may comprise a parallel alignment.

In some embodiments, the ground plane and each of the plurality of substrates may form an angle, the angle comprising between and inclusive of seventy and ninety degrees.

Manufacturing

Generally, the substrate is made of industry standard material such as ceramic, plastic polymer, or low-cost fiber-glass. Examples may include FR4, Kapton or Pyralux with printed circuit design affixed thereto. Otherwise, the substrate can be fabricated in accordance with the level and knowledge of one having skill in the art.

The antenna radiators may be fabricated by etching the antenna element pattern in a metal trace bonded to an insulating dielectric substrate, such as a printed circuit board.

Each of the components of the antenna and related system described herein may be manufactured and/or assembled in accordance with the conventional knowledge and level of a person having skill in the art.

Applications of the disclosed embodiments may include automotive applications where multiple wireless technologies are needed while have limiting space and excessive long-term vibrations. The MIMO antenna system as disclosed can be used in other applications and industries as can be appreciated by one having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Description of Embodiments

Figure 1:
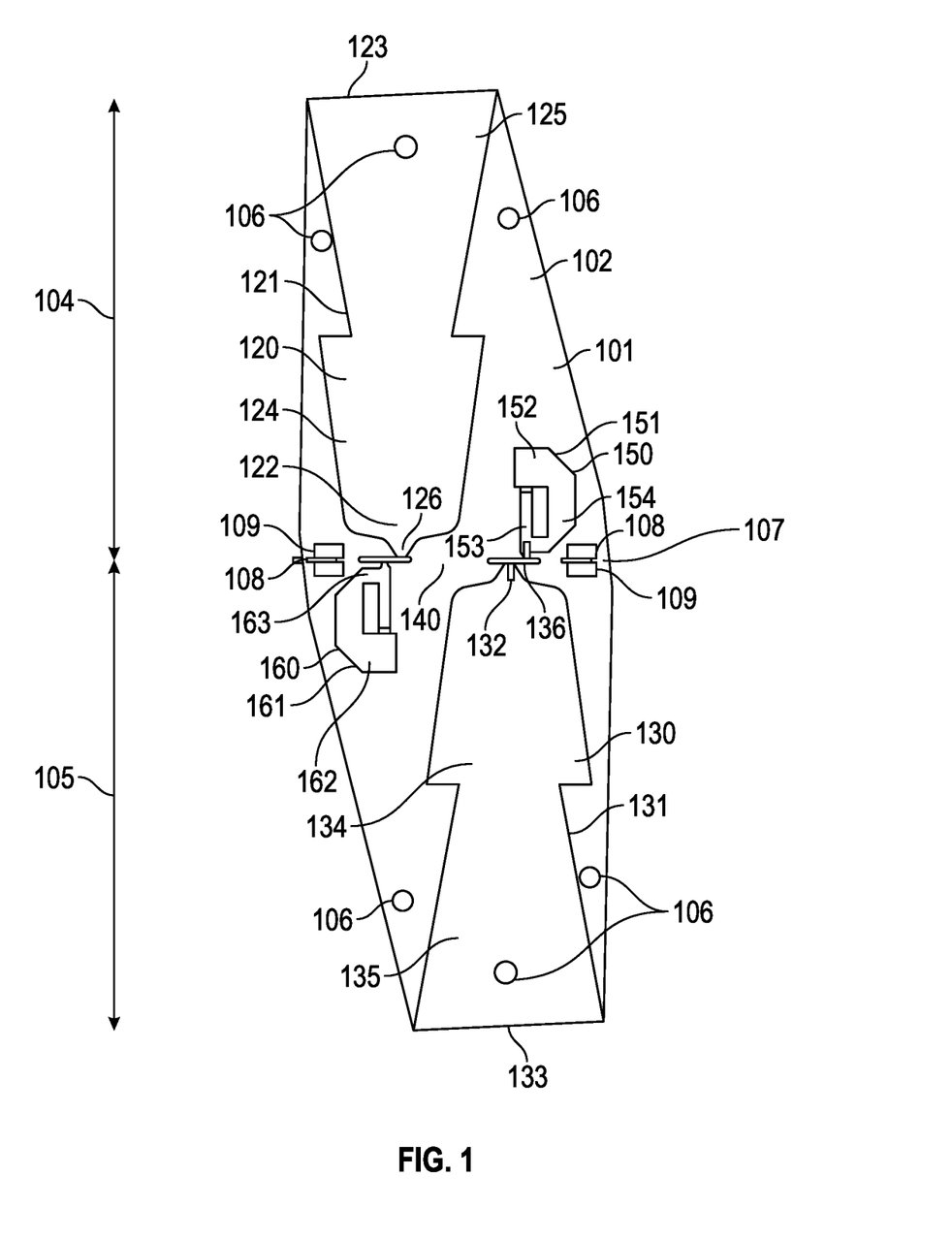
FIG. 1 shows a top view of a MIMO antenna system in accordance with a first illustrated embodiment.

FIG. 1 shows a top view of a MIMO antenna system (100) in accordance with a first illustrated embodiment. The system comprises a substrate (101) having a first side (102) and a second side opposite the first side. The substrate can be divided into a first longitudinal half (104) and a second longitudinal half (105). A middle portion (107) is disposed between the first and second longitudinal halves. Various antenna radiators are disposed on the first side of the substrate in particular positions and orientations. Specifically, a first antenna radiator (120) is disposed on the first longitudinal half, wherein the first antenna radiator vertically extends from a first proximal end (122) to a first distal end (123). Disposed at the first proximal end is a first apex (126), the first apex being disposed at the middle portion. A second antenna radiator (130) is disposed on the second longitudinal half, wherein the second antenna radiator vertically extends from a second proximal end (132) to a second distal end (133). Disposed at the second proximal end is a second apex (136), the second apex being disposed at the middle portion. The first and second antenna radiators comprise a first antenna periphery (121) and a second antenna periphery (131) respectively, wherein the first and second antenna periphery are substantially similar or identical. The second antenna radiator can be characterized as a mirror opposite of the first antenna radiator. However, instead of being directly opposite from one another at the first and second apexes, a horizontal offset (140) exists between the first apex and second apex. Such an offset improves antenna performance and provides for better isolation. The greater the horizontal offset the better the isolation, but also a larger footprint. To minimize the footprint of the substrate, the first and second antenna radiators are spaced apart such that at least a portion of the first distal end overlaps with at least a portion of the second distal end. Due to the horizontal offset and the mirror configuration of the first and second antenna radiators, a portion of the first distal end does not overlap with a portion of the second distal end.

The first antenna periphery (121) comprises a unique dress-like profile comprising a first distal tapered portion (125) disposed near the first distal end (123), and a first proximal tapered portion (124) disposed at the first proximal end (122). The first proximal tapered portion includes the first apex (126) disposed at a center terminal end thereof. The first proximal tapered portion comprises angled corners near a coupling with the first distal tapered portion, and further comprises curved corners near the first proximal end. The first distal tapered portion tapers outward toward the first distal end such that a portion of the first distal tapered portion is greater than a widest portion of the first proximal tapered portion. The first distal and proximal tapered portions can be characterized as centrically aligned with each other and longitudinally symmetrically. The second antenna periphery (131) comprises a similar dress-like profile as described for the first antenna periphery, including a second distal tapered portion (135) disposed at the second distal end (133) and a second proximal tapered portion (134) disposed at the second proximal end (132). The first distal end is characterized as being in a parallel formation with the second distal end.

For maximizing use of space, portions of the substrate (110) not occupied by the first antenna radiator (120) and the second antenna radiator (130) are occupied by another set of antenna radiators, namely a third antenna radiator (150) and a fourth antenna radiator (160). The third antenna radiator is disposed on the first longitudinal half (104) and is directly opposite the second antenna radiator. The fourth antenna radiator is disposed on the second longitudinal half (105) and is directly opposite the first antenna radiator. The third antenna radiator comprises a third antenna periphery (151) and the fourth antenna radiator comprises a fourth antenna periphery (161) such that the third and fourth antenna peripheries are substantially similar or identical. The fourth antenna radiator is oriented with respect to the third antenna radiator in a manner where the fourth antenna radiator comprises both a vertical reflection and a horizontal reflection of the third antenna radiator.

The third antenna periphery (151) comprises a third main body (152) and a third elongated portion (153) extending from the third main body wherein the third elongated portion comprises a plurality of bends (154) which may, or may not, produce right angle corners of the third elongated portion. A portion of the third elongated portion bends back towards the third main body. The fourth periphery (161) comprises a similar or identical periphery as the third antenna periphery, including the fourth main body (162) and the fourth elongated portion (163) comprising a plurality of bends (164).

The substrate (101) comprises a plurality of apertures (108) disposed at the middle portion (107). The plurality of apertures is configured to receive portions of a ground plane, such as tabs of the ground plane disposed on a side thereof. The first apex (126), the second apex (136), the third antenna radiator (150), and the fourth antenna radiator (160) are each disposed adjacent or abutting at least one of the plurality of apertures. Other apertures of the plurality of apertures are disposed between fixating pads (109) of the substrate for providing a secure coupling of the ground plane with the substrate. To further increase mechanical coupling and mitigate excessive vibrations to the antenna radiators, a plurality of fixating holes (106) is disposed throughout the substrate, including at least one of the plurality of fixating holes being disposed on the first antenna radiator (120) and at least one of the plurality of fixating holes being disposed on the second antenna radiator (130). By having some of the plurality of fixating holes disposed on the first and second antenna radiators, size of the substrate is reduced and performance of the first and second antenna radiators is not significantly impacted.

As shown, the first and second antenna radiators (120; 130) may be configured to function with 5G NR sub-6 GHz and the third and fourth antenna elements (150; 160) may be configured to function with Wi-Fi 2.4 GHZ, 5 GHZ, and 6 GHz.

Figure 2:
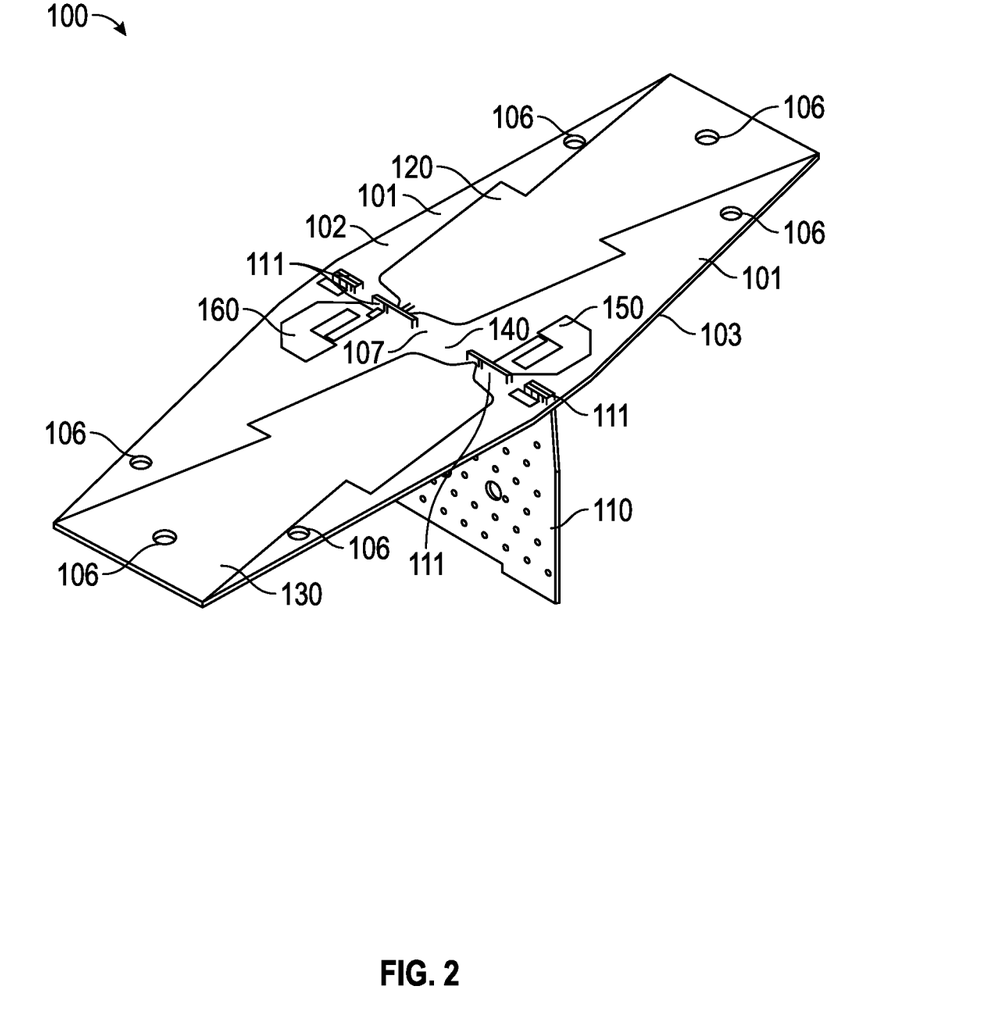
FIG. 2 shows a top perspective view of the MIMO antenna system according to the first illustrated embodiment.

FIG. 2 shows a top perspective view of the MIMO antenna system (100) according to the first illustrated embodiment. The MIMO antenna system includes a substrate (101) having a first side (102) and a second side (103) opposite the first side. The substrate includes a middle portion (107) having a plurality of apertures. Coupled to the second side of the substrate is a ground plane (110), the ground plane comprising a plurality of tabs (111) that extend through the plurality of apertures. The ground plane is shown at or near a perpendicular orientation with the substrate. Such an orientation provides for support to the substrate, especially when the MIMO antenna system is disposed within a housing dome. Having the ground plane disposed beneath the substrate reduces footprint of the substrate and allows for a smaller form factor. A perpendicular formation has advantages which includes production repeatability given that apertures drilled through a substrate are generally done perpendicularly. Other angles between the ground plane and substrate may also be utilized besides ninety degrees, with preferable embodiments having an angle between and inclusive of seventy and one hundred and ten degrees.

Disposed on the first side (102) of the substrate (101) is a plurality of antenna radiators, namely, a first antenna radiator (120), a second antenna radiator (130), a third antenna radiator (150), and a fourth antenna radiator (160). The first and second antenna radiators are characterized as being mirror opposites of each other with a horizontal offset (140). The third and fourth antenna radiators are characterized as having a vertical and horizontal reflections with respect to each other.

As shown, the plurality of tabs (111) is disposed on an edge of the ground plane (110), thereby causing the ground plane to be at or near a perpendicular alignment when the plurality of tabs extends through the plurality of apertures of the substrate (101). In alternative embodiments, the plurality of tabs may extend perpendicularly from the ground plane such that the ground plane is parallel or nearly parallel to the substrate when the plurality of tabs extends through the plurality of apertures of the substrate.

Figure 3:
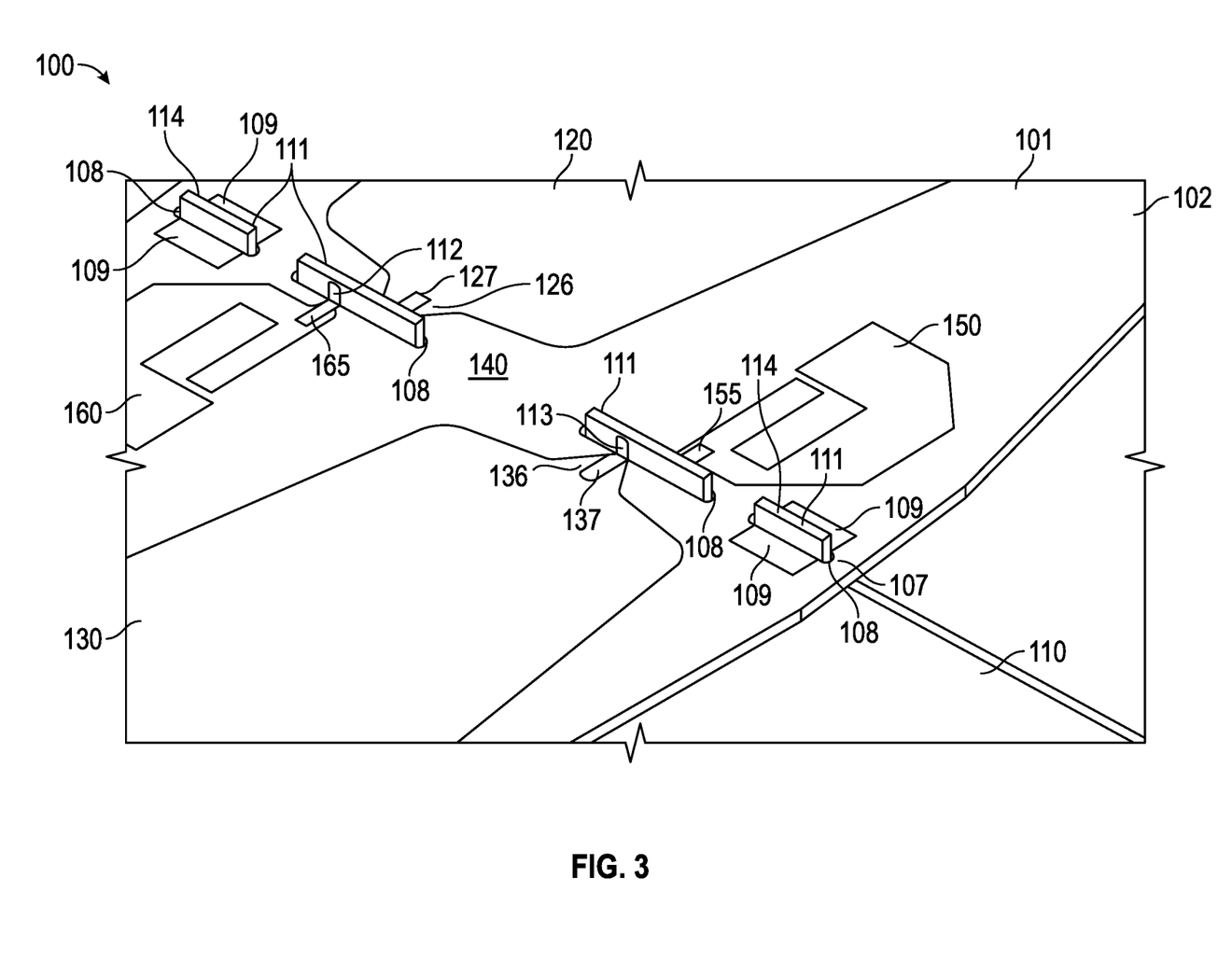
FIG. 3 shows a close-up view of the MIMO antenna system according to the first illustrated embodiment.

FIG. 3 shows a close-up view of the MIMO antenna system (100) according to the first illustrated embodiment. The system comprises a substrate (101) having a plurality of apertures (108) disposed at middle portion (107) thereof. Extending through the plurality of apertures is a plurality of tabs (111) of a ground plane (110). The plurality of tabs includes a first feed line tab (112) and a second feed line tab (113) and may include one or more fixating tabs (114). Disposed on a first side (102) of the substrate is a first antenna radiator (120) having a first feed pad (127) disposed on a first apex (126), a second antenna radiator (130) having a second feed pad (137) disposed on a second apex (126), a third antenna radiator (150) having a third feed pad (155), and a fourth antenna radiator (160) having a fourth feed pad (165). The plurality of apertures may comprise slots which are collinearly aligned to allow the ground plane having a flat planar shape to easily align and fit with the plurality of apertures.

Disposed on either side of the first feed line tab (112) and the second feed line tab (113) is a feed line configured to electrically couple with a feed pad of one of the first through fourth antenna radiators (120; 130; 150; 160). Specifically, the first feed line tab is disposed between the first and fourth antenna radiators and the second feed line tab is disposed between the second and third antenna radiators. The first antenna radiator electrically couples to the first feed line tab via the first feed pad (127) on a side opposite the fourth antenna radiator. Likewise, the second antenna radiator electrically couples to the second feed line tab via the second feed pad (137) on a side opposite the third antenna radiator. The first and second feed line tabs are characterized as being orthogonal to the first through fourth feed pads.

The plurality of tabs (111) further includes one or more fixating tabs (114) which extend through one or more of the plurality of apertures (108). Disposed on the substrate (101) at both or either side of each fixating tab is a fixating pad (109) which can be soldered or otherwise mechanically affixed to the ground plane (110).

Figure 4:
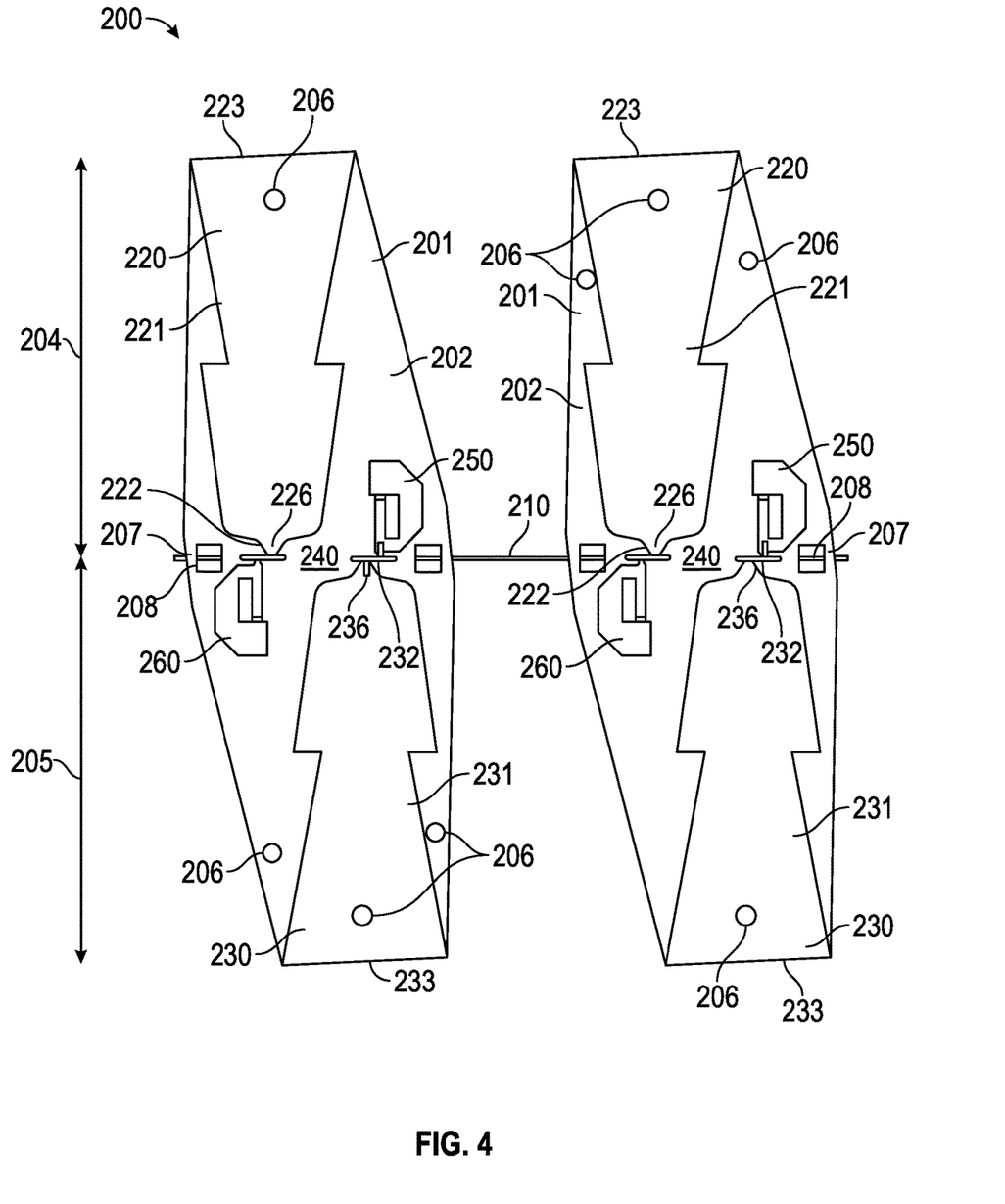
FIG. 4 shows a top view of a MIMO antenna system in accordance with a second illustrated embodiment.

FIG. 4 shows a top view of a MIMO antenna system (200) in accordance with a second illustrated embodiment. The MIMO antenna system is shown as an array of individual MIMO antenna systems already disclosed herein. The MIMO antenna system specifically shows two substrates (201), each of the substrates having a first side (202), a first longitudinal half (204), and a second longitudinal half (205). Each substrate further includes a middle portion (207) disposed between the first longitudinal half and the second longitudinal half, the middle portion comprising a plurality of apertures (208) extending across the middle portion in a collinear alignment. Disposed on the first side of each substrate is a first antenna radiator (220), a second antenna radiator (230), a third antenna radiator (250), and a fourth antenna radiator (260). Each first antenna radiator comprises a first proximal end (222) and a first distal end (223), the first proximal end comprising a first apex (226) disposed at the middle portion and adjacent to one of the plurality of apertures associated therewith. Each second antenna radiator comprises a second proximal end (232) and a second distal end (233), the second proximal end comprises a second apex (326) disposed at the middle portion and adjacent to one of the plurality of apertures associated therewith. On each substrate, the second apex and the first apex are separated by a horizontal offset (240). The first antenna radiator comprises a first antenna periphery (221) which is similar or identical with a second antenna periphery (231) of the second antenna radiator.

A ground plane (210) is coupled to each substrate (201) through the plurality of apertures (208) disposed on each substrate. The ground plane comprises a plurality of tabs (211) disposed on an edge thereof wherein each of the plurality of tabs is configured to fit and extend through one of the plurality of apertures. In a preferable embodiment, the fit of each of the plurality tabs with each of the plurality of apertures is sufficient to allow translation therethrough without interference while also providing a snug fit for mechanical purposes. Each of the substrates further comprise a plurality of fixating holes (206) wherein in at least one of the plurality of fixating holes is disposed on each first antenna radiator (220) and on each second antenna radiator (230).

Figure 5:
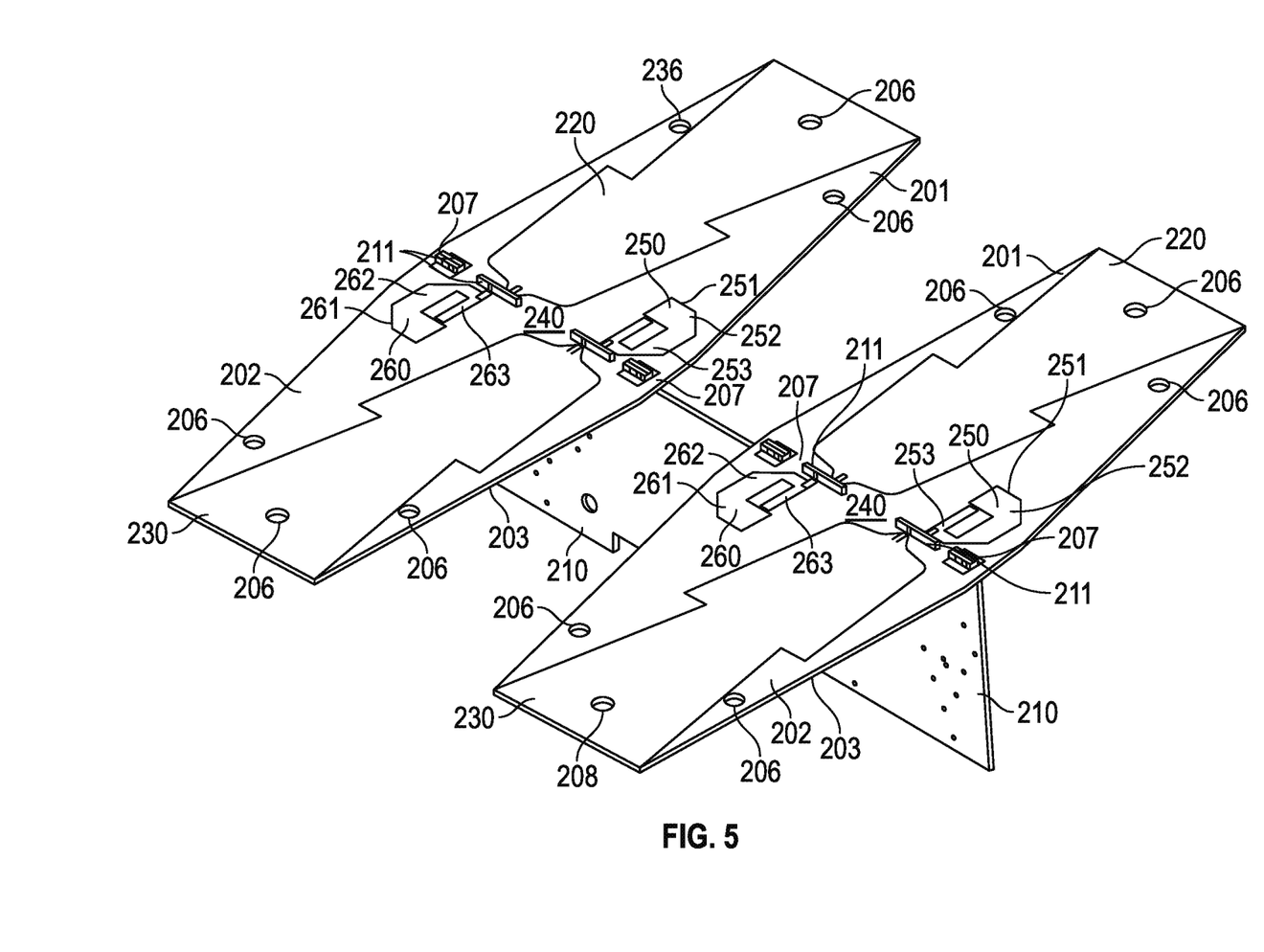
FIG. 5 shows a top perspective view of the MIMO antenna system according to the second illustrated embodiment.

FIG. 5 shows a top perspective view of the MIMO antenna system (200) according to the second illustrated embodiment. The MIMO antenna system comprises an array of substrates (201) each comprising a first antenna radiator (220), a second antenna radiator (230), a third antenna radiator (250), and a fourth antenna radiator (260) disposed on a first side (202) thereof. A second side (203) opposite the first side is disposed a single ground plane (210) coupled therewith. The ground plane comprises a plurality of tabs (211) configured to extend through a plurality of apertures disposed at a middle portion (207) of each of the substrates. Each of the first through fourth antenna radiators on each substrate is configured to electrically couple with at least one of the plurality of tabs of the ground plane. The plurality of apertures on each substrate can be characterized as being in a collinear alignment. Furthermore, the each of the plurality of apertures can be characterized as being in collinear alignment with each other of the plurality of apertures.

The third antenna radiator (250) on each substrate (201) comprises a third antenna periphery (251) having a third main body (252) and a third elongated portion (253), the third elongated portion comprising a plurality of bends. The fourth antenna radiator (260) on each substrate comprises a fourth antenna periphery (261) being same or similar to the third antenna periphery, including having a fourth main body (262) and a fourth elongated portion (263), the fourth elongated portion comprising a plurality of bends.

The MIMO antenna system (200) is shown comprising two substates (201) coupled in an array formation to the ground plane (210). However, it will be appreciated by one having skill in the art that a number of substrates greater than two can also be utilized to form an array including but not limited to three, four, five, etc.

Figure 6:
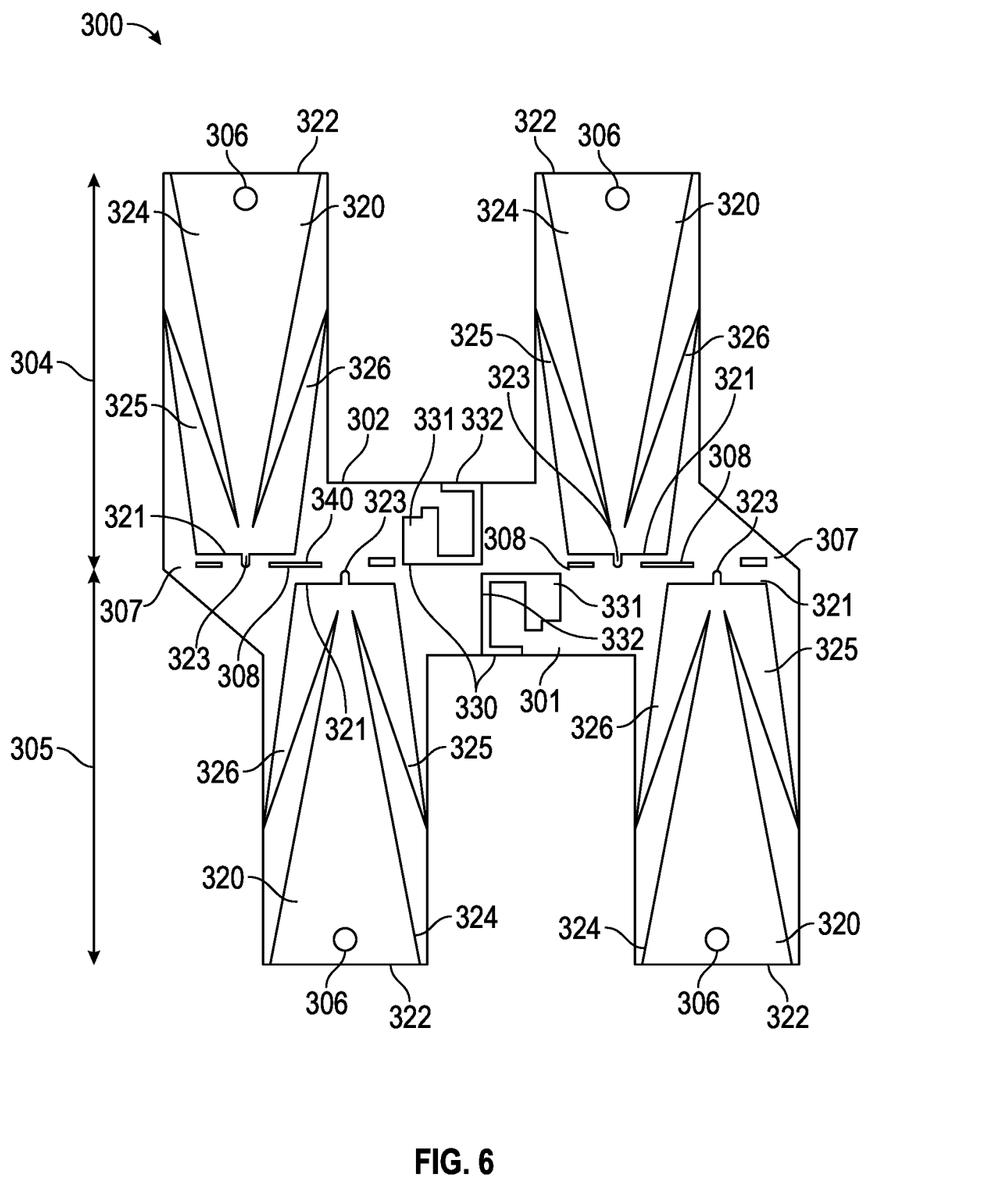
FIG. 6 shows a top view of a MIMO antenna system in accordance with a third illustrated embodiment.

FIG. 6 shows a top view of a MIMO antenna system (300) in accordance with a third illustrated embodiment. The MIMO antenna system comprises a substrate (301) having a plurality of first antenna radiators (320) and a plurality of second antenna radiators (330) disposed on a first side (302) thereof. The substrate further comprises a second side (not shown) opposite the first side configured to receive a ground plane. The substrate comprises a first longitudinal half (304), a second longitudinal half (305), and a middle portion (307) disposed between the junction of the first and second longitudinal halves. The middle portion comprises a plurality of apertures (308) configured to receive a plurality of tabs from the ground plane. As shown, the MIMO antenna system comprises four first antenna radiators for cellular applications and two second antenna radiators for Wi-Fi applications.

The plurality of first antenna radiators (320) are positioned and oriented such that each of the of the plurality of first antenna radiators is a mirror opposite to at least two other of the plurality of first antenna radiators. Further, each of the plurality of first antenna radiators is in a parallel formation with at least one other of the plurality of first antenna radiators. Each of the plurality of first antenna radiators comprises a monopole element (324) extending from a proximal end (321) to a distal end (322). Coupled at the proximal end is a first tapered element (325) and a second tapered element (326). Disposed at the proximal end is an apex (323). Each first apex comprises a horizontal offset (340) with a neighboring first apex of the plurality of first antenna radiators. Disposed at each of the plurality of first antenna radiators is at least one of a plurality of fixating holes (306).

The plurality of second antenna radiators (330) are each disposed in reflected formation with respect to each other. As shown, one of the plurality of second antenna radiators comprises a vertical reflection along a longitudinal, and further includes a horizontal reflection. Each of the plurality of second antenna radiators comprises a main body (331)

and an elongated portion (332) coupled to the main body, the elongated portion comprising a plurality of bends forming a plurality of right angles.

Figure 7:
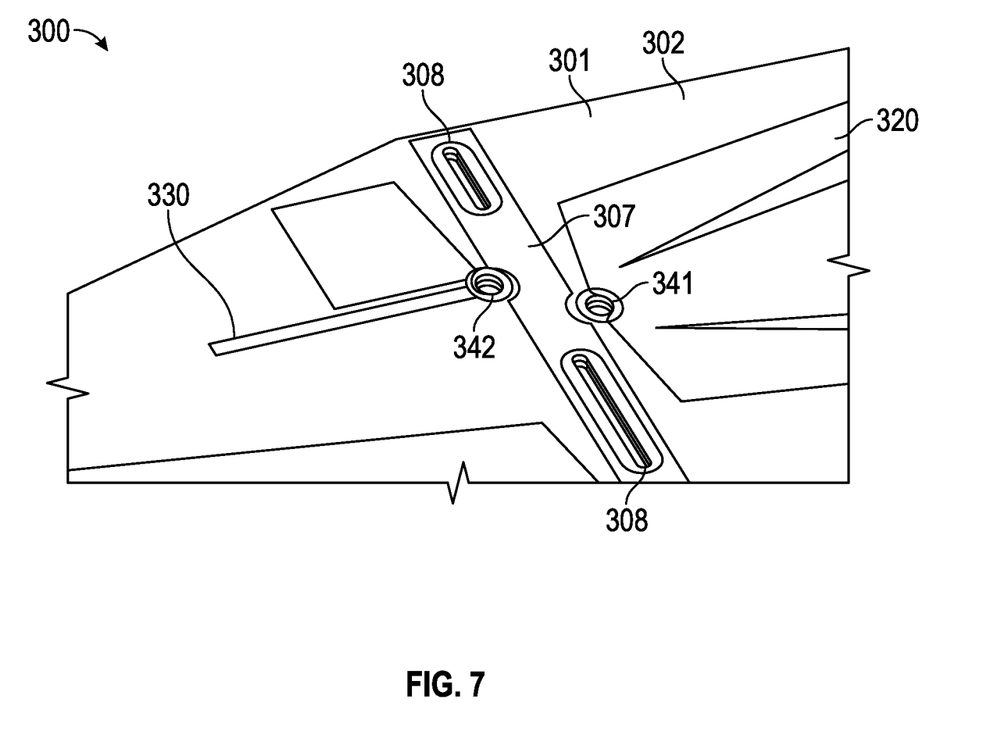
FIG. 7 shows a close-up view of the MIMO antenna system according to the third illustrated embodiment.

FIG. 7 shows a close-up view of the MIMO antenna system (300) according to the third illustrated embodiment. The MIMO antenna system includes a substrate (301) having a plurality of first antenna radiators (320) and a plurality of second antenna radiators (330) disposed on a first side (302) thereof. The substrate is configured to couple with a ground plane on a second side opposite the first side. An alternative means of electrically coupling the ground plane to the substrate is shown. Here, a first via paid (341) disposed on each of the plurality of first antenna radiators and a second via pad (342) disposed on each of the plurality of second antenna radiators is configured to allow a cable be soldered directly to each radiating element.

FEATURE LIST

MIMO antenna system (100; 200; 300)
substrate (101; 201; 301)
first side (102; 202; 302)
second side (103; 203)
first longitudinal half (104; 204; 304)
second longitudinal half (105; 205; 305)
plurality of fixating holes (106; 206; 306)
middle portion (107; 207; 307)
plurality of apertures (108; 208; 308)
fixating pad (109; 209; 309)
ground plane (110; 210)
plurality of tabs (111; 211)
first feed line tab (112; 212)
second feed line tab (113; 213)
fixating tab (114; 214)
first antenna radiator (120; 220)
first antenna periphery (121; 221)
first proximal end (122; 222)
first distal end (123; 223)
first proximal tapered portion (124; 224)
first distal tapered portion (125; 225)
first apex (126; 226)
first feed pad (127; 227)
second antenna radiator (130; 230)
second antenna periphery (131; 231)
second proximal end (132; 232)
second distal end (133; 233)
second proximal tapered portion (134; 324)
second distal tapered portion (135; 235)
second apex (136; 236)
second feed pad (137; 237)
horizontal offset (140; 240; 340)
third antenna radiator (150; 250)
third antenna periphery (151; 251)
third main body (152; 252)
third elongated portion (153; 253)
plurality of bends (154; 164; 254; 264)
third feed pad (155; 255)
fourth antenna radiator (160; 260)
fourth antenna periphery (161; 261)
fourth main body (162; 262)
fourth elongated portion (163; 263)
fourth feed pad (165; 265)
plurality of first antenna radiators (320)
proximal end (321)
distal end (322)
apex (323)
monopole element (324)
first tapered element (325)
second tapered element (326)
plurality of second antenna radiators (330)
main body (331)
elongated portion (332)
first via pad (341)
second via pad (342)

What is claimed is:

1. A MIMO antenna system, comprising:
a substrate having a first longitudinal half, a second longitudinal half, and a middle portion disposed between the first longitudinal half and the second longitudinal half, the substrate further comprising a first side and a second side opposite the first side, the middle portion comprising a plurality of apertures;
a first antenna radiator disposed on the first side of the substrate at the first longitudinal half,
the first antenna radiator vertically extending from a first proximal end to a first distal end, the first proximal end comprising a first apex disposed at the middle portion, the first apex having a first feed pad;
a second antenna radiator disposed on the first side of the substrate at the second longitudinal half,
the second antenna radiator vertically extending from a second proximal end to a second distal end, the second proximal end comprising a second apex disposed at the middle portion, the second apex having a second feed pad;
a third antenna radiator disposed on the first side of the substrate at the first longitudinal half, the third antenna radiator having a third feed pad disposed at the middle portion;
a fourth antenna radiator disposed on the first side of the substrate at the second longitudinal half, the fourth antenna radiator having a fourth feed pad disposed at the middle portion; and
a ground plane configured to couple to the second side of the substrate,
the ground plane comprising a plurality of tabs configured to extend through the plurality of apertures, at least one of the plurality of tabs configured to electrically couple to each of the first through fourth antenna radiators;
characterized in that:
the first apex and the second apex are separated by a horizontal offset, and
the second antenna radiator is a mirror opposite of the first antenna radiator.

2. The MIMO antenna system of claim 1, wherein the fourth antenna radiator comprises a vertical reflection of the third antenna radiator and further comprises a horizontal reflection of the third antenna radiator.

3. The MIMO antenna system of claim 1, the plurality of tabs further comprising a first feed line tab and a second feed line tab, the first feed line tab configured to electrically couple with the first feed pad and the fourth feed pad, and the second feed line tab configured to electrically couple with the second feed pad and the third feed pad.

4. The MIMO antenna system of claim 3, wherein the first feed line tab and the second feed line tab are each orthogonal to the first through fourth feed pads.

5. The MIMO antenna system of claim 1, wherein the plurality of apertures comprises a collinear alignment.

6. The MIMO antenna system of claim 1, the substrate further comprising a plurality fixating holes wherein at least one of the plurality of fixating holes is disposed on the first antenna radiator and at least one of the plurality of fixating holes is disposed on the second antenna radiator.

7. The MIMO antenna system of claim 1, wherein the ground plane comprises a perpendicular orientation with the substrate.

8. A MIMO antenna system, comprising:
a substrate having a first longitudinal half, a second longitudinal half, and a middle portion disposed between the first longitudinal half and the second longitudinal half, the substrate further comprising a first side and a second side opposite the first side, the middle portion comprising a plurality of apertures;
a first antenna radiator disposed on the first side of the substrate at the first longitudinal half,
the first antenna radiator vertically extending from a first proximal end to a first distal end, the first proximal end comprising a first apex disposed at the middle portion;
a second antenna radiator disposed on the first side of the substrate at the second longitudinal half,
the second antenna radiator vertically extending from a second proximal end to a second distal end, the second proximal end comprising a second apex disposed at the middle portion; and
a ground plane configured to couple to the second side of the substrate,
the ground plane comprising a plurality of tabs configured to extend through the plurality of apertures, at least one of the plurality of tabs configured to electrically couple to each of the first and second antenna radiators;
characterized in that:
the first apex and the second apex are separated by a horizontal offset, and
the second antenna radiator is a mirror opposite of the first antenna radiator.

9. The MIMO antenna system of claim 8, wherein the plurality of apertures comprises a collinear alignment.

10. The MIMO antenna system of claim 8, the substrate further comprising a plurality fixating holes wherein at least one of the plurality of fixating holes is disposed on the first antenna radiator and at least one of the plurality of fixating holes is disposed on the second antenna radiator.

11. The MIMO antenna system of claim 8, wherein the ground plane comprises a perpendicular orientation with the substrate.

12. A MIMO antenna array, comprising:
a plurality of substrates, each of the plurality of substrates comprising:
a first longitudinal half and a second longitudinal half,
a middle portion disposed between the first longitudinal half and the second longitudinal half, the middle portion comprising a plurality of apertures
a first side and a second side opposite the first side,
a first antenna radiator disposed on the first side of the substrate at the first longitudinal half, the first antenna radiator vertically extending from a first proximal end to a first distal end, the first proximal end comprising a first apex disposed at the middle portion,
a second antenna radiator disposed on the first side of the substrate at the second longitudinal half, the second antenna radiator vertically extending from a second proximal end to a second distal end, the second proximal end comprising a second apex disposed at the middle portion, the second antenna radiator is a mirror opposite of the first antenna radiator,
a third antenna radiator disposed on the first side of the substrate at the first longitudinal half, and
a fourth antenna radiator disposed on the first side of the substrate at the second longitudinal half; and
a ground plane configured to couple to the second side of each of the plurality of substrates,
the ground plane comprising a plurality of tabs configured to extend through each of the plurality of apertures;
characterized in that the first apex and the second apex of each of the plurality of substrates are separated by a horizontal offset.

13. The MIMO antenna array of claim 12, wherein the fourth antenna radiator comprises a vertical reflection of the third antenna radiator and further comprises a horizontal reflection of the third antenna radiator.

14. The MIMO antenna array of claim 12, wherein:
a first feed pad disposed on the first apex
a second feed pad disposed on the second apex;
a third feed pad disposed on the third antenna radiator at the middle portion; and
a fourth feed pad disposed on the fourth antenna radiator at the middle portion;
wherein at least one of the plurality of tabs is configured to electrically couple to each of the first through fourth antenna radiators.

15. The MIMO antenna array of claim 12, the plurality of tabs further comprising a first feed line tab and a second feed line tab, the first feed line tab configured to electrically couple with the first feed pad and the fourth feed pad, and the second feed line tab configured to electrically couple with the second feed pad and the third feed pad.

16. The MIMO antenna array of claim 12, wherein each of the plurality of substrates may further comprise a plurality fixating holes wherein the first and second antenna radiators of each of the plurality of substrate comprises at least one of the plurality of fixating holes.

17. The MIMO antenna array of claim 12, wherein each of the plurality of substrates further comprises a first via pad disposed on the first antenna radiator and a second via pad disposed on the third antenna radiator.

18. The MIMO antenna array of claim 12, wherein the plurality of apertures comprises a collinear alignment.

19. The MIMO antenna array of claim 12, wherein the ground plane comprises a perpendicular orientation with each of the plurality of substrates.

20. The MIMO antenna array of claim 12, wherein the plurality of substrates comprises a parallel alignment.

* * * * *